(12) United States Patent
Jeon

(10) Patent No.: US 8,723,812 B2
(45) Date of Patent: May 13, 2014

(54) MOBILE TERMINAL AND METHOD OF CONTROLLING THE MOBILE TERMINAL

(75) Inventor: Hyun Joo Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 983 days.

(21) Appl. No.: 12/405,647

(22) Filed: Mar. 17, 2009

(65) Prior Publication Data

US 2010/0066688 A1    Mar. 18, 2010

(30) Foreign Application Priority Data

Sep. 8, 2008  (KR) .......................... 10-2008-0088378

(51) Int. Cl.
*G06F 3/041*    (2006.01)

(52) U.S. Cl.
USPC ........................................................ 345/173

(58) Field of Classification Search
None
See application file for complete search history.

(56) References Cited

U.S. PATENT DOCUMENTS

| | | | |
|---|---|---|---|
| 2008/0165148 A1* | 7/2008 | Williamson et al. | 345/173 |
| 2009/0007017 A1* | 1/2009 | Anzures et al. | 715/835 |
| 2009/0265627 A1* | 10/2009 | Kim et al. | 715/702 |
| 2009/0278806 A1* | 11/2009 | Duarte et al. | 345/173 |

* cited by examiner

*Primary Examiner* — Joseph Haley
*Assistant Examiner* — Emily Frank
(74) *Attorney, Agent, or Firm* — Birch, Stewart, Kolasch & Birch, LLP

(57) ABSTRACT

A mobile terminal and a method of controlling the mobile terminal are provided. The method includes displaying a web page screen on a touch screen of the mobile terminal; choosing a portion of the web page in response to a touch input to the touch screen; and if a movement of the mobile terminal is detected, selectively refreshing the chosen web page portion and displaying the refreshed web page portion. Therefore, it is possible to selectively refresh a portion of a web page chosen by a user.

11 Claims, 17 Drawing Sheets

MOBILE TERMINAL AND METHOD OF CONTROLLING THE MOBILE TERMINAL

CROSS-REFERENCE TO RELATED APPLICATION

This application claims the priority benefit of Korean Patent Application No. 10-2008-0088378, filed on Sep. 8, 2008 in the Korean Intellectual Property Office, the disclosure of which is incorporated herein by reference.

BACKGROUND OF THE INVENTION

1. Field of the Invention

The present invention relates to a mobile terminal capable of selectively refreshing a portion of a screen image chosen by a user in response to movement of the mobile terminal and a method of controlling the mobile terminal.

2. Description of the Related Art

Mobile terminals are portable devices, which can provide users with various services, such as, a voice calling service, a video calling service, an information input/output service, and a data storage service. As the types of services provided by the mobile terminals diversify, an increasing number of the mobile terminals have been equipped for, and are able to perform, various complicated functions, such as, capturing photos or moving pictures, playing music files or moving image files, providing game programs, receiving broadcast programs and providing wireless Internet services. Accordingly, the mobile terminals have thus evolved into multimedia players.

Various attempts have been made to realize such complicated functions with hardware devices or software programs. For example, various user interface (UI) environments, in which users are allowed to easily search for and choose desired functions, have been developed. In the meantime, users may often access the Internet with their mobile terminals and refresh web pages displayed on the screens of their mobile terminals. In this case, delays in the refreshing of a web page may occur according to the performance of mobile terminals and the amount of data transmitted through the Internet. In addition, even though mobile terminals generally do not display whole web pages at the same time, users may need to refresh a whole web page and move the web page to look up a desired portion of the web page in order to view a refreshed version of the desired web page portion. Therefore, it may often be time-and effort-consuming to properly refresh a desired portion of a web page or a screen page displayed on the screen of a mobile terminal.

SUMMARY OF THE INVENTION

Embodiments of present invention provides a mobile terminal capable of selectively refreshing a portion of a web page screen or a screen image including information desired by a user, through simple manipulation, and a method of controlling the mobile terminal.

According to an aspect of the present invention, there is provided a method of controlling a mobile terminal, the method including displaying a web page on a touch screen of the mobile terminal; choosing a portion of the web page in response to a touch input to the touch screen; and if a movement of the mobile terminal is detected, selectively refreshing the chosen web page portion and displaying the refreshed web page portion on the touch screen.

According to another aspect of the present invention, there is provided a mobile terminal including a touch screen configured to display a web page; an acceleration sensor configured to determine a movement of the mobile terminal; and a controller configured to selectively refresh a portion of the web page chosen in response to a touch input to the touch screen based on a measurement value provided by the acceleration sensor if the movement of the mobile terminal is detected.

According to another aspect of the present invention, there is provided a method of controlling a mobile terminal, the method including displaying a folder list on a touch screen of the mobile terminal; choosing one of a plurality of folders included in the folder list in response to a touch input to the touch screen; and if a movement of the mobile terminal is detected, performing an operation corresponding to the chosen folder.

According to another aspect of the present invention, there is provided a mobile terminal including a touch screen configured to display a folder list; an acceleration sensor configured to determine a movement the mobile terminal; and a controller configured to perform an operation corresponding to a folder chosen from the folder list in response to a touch input to the touch screen based on a measurement value provided by the acceleration sensor, if the movement of mobile terminal is detected.

According to another aspect of the present invention, there is provided a method of controlling a mobile terminal, the method including displaying a file list on a touch screen of the mobile terminal; choosing one of a plurality of files included in the file list in response to a touch input to the touch screen; and if a movement of the mobile terminal is detected, scrolling the file list excluding the chosen file while controlling the chosen file to stay in place.

According to another aspect of the present invention, there is provided a mobile terminal including a touch screen configured to display a file list; an acceleration sensor configured to determine a movement of the mobile terminal; and a controller configured to scroll the file list excluding a file chosen in response to a touch input while controlling the chosen file to stay in place, based on a measurement value provided by the acceleration sensor, if the movement of the mobile terminal is detected.

According to another aspect of the present invention, there is provided a method of controlling a mobile terminal, the method including displaying a plurality of images on a touch screen of the mobile terminal; choosing one of the images in response to a touch input to the touch screen; and if a movement of the mobile terminal is detected, replacing all of the plurality of images except the chosen image with other images.

According to another aspect of the present invention, there is provided a mobile terminal including a touch screen configured to display a plurality of images; an acceleration sensor configured to determine a movement of the mobile terminal; and a controller configured to replace all of the plurality images except an image chosen in response to a touch input to the touch screen with other images based on a measurement value provided by the acceleration sensor if the movement of the mobile terminal is detected.

BRIEF DESCRIPTION OF THE DRAWINGS

The above and other features and advantages of the present invention will become more apparent by describing in detail various embodiments thereof with reference to the attached drawings in which.

DETAILED DESCRIPTION OF THE INVENTION

Embodiments of the present invention will hereinafter be described in detail with reference to the accompanying drawings in which example embodiments of the invention are shown. The term 'mobile terminal', as used herein, may indicate a mobile phone, a smart phone, a laptop book computer, a digital broadcast receiver, a personal digital assistant (PDA), a portable multimedia player (PMP), or a navigation device.

Figure 1:
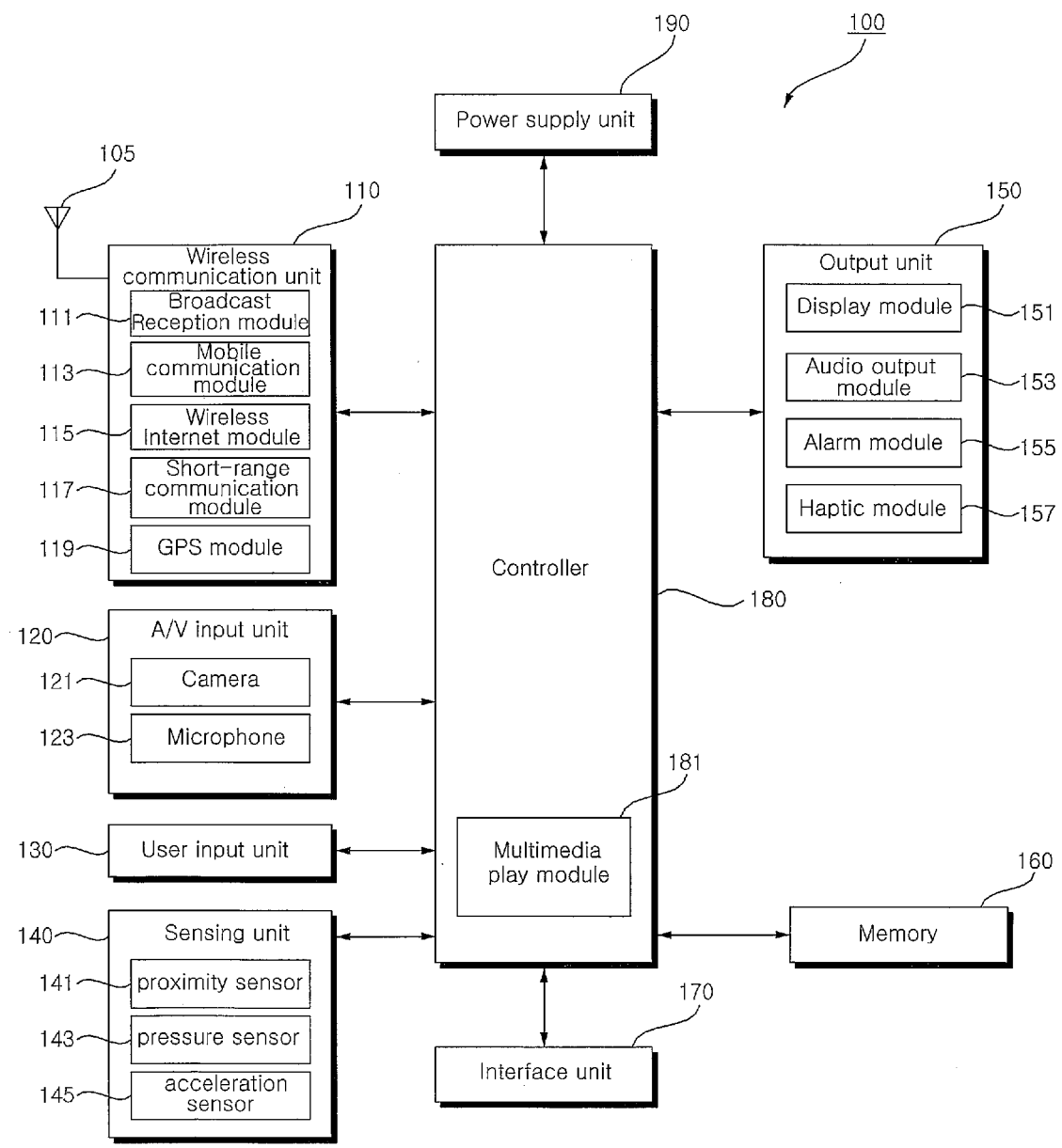
FIG. 1 illustrates a block diagram of a mobile terminal according to an example embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and/or a global positioning system (GPS) module 119. The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) format, or electronic service guide (ESG) of digital video broadcast-handheld (DVB-H) format.

The broadcast reception module 111 may receive the broadcast signal using various broadcasting systems, such as, digital multimedia broadcasting-terrestrial (DMB-T), digital multimedia broadcasting-satellite (DMB-S), media forward link only (MediaFLO), DVB-H, and integrated services digital broadcast-terrestrial (ISDB-T) formats. In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, and/or text/multimedia messages.

The wireless Internet module 115 may be a module for wirelessly accessing the Internet. The wireless Internet module 115 may be embedded in the mobile terminal 100 or may be installed in an external device. The wireless Internet module 115 may use various wireless Internet techniques or protocols, such as, wireless fidelity (WiFi), wireless broadband (Wibro), world interoperability for microwave access (Wimax) or high-speed downlink Packet Access (HSDPA).

The short-range communication module 117 may be a module for short-range communication. The short-range communication module 117 may use various short-range communication techniques or protocols, such as, Bluetooth, radio frequency identification (RFID), infrared data association (IrDA), ultra wideband (UWB), and ZigBee. The GPS module 119 may receive position information from a plurality of GPS satellites.

The A/V input unit 120 may be used to receive audio signals or video signals. The A/V input unit 120 may include a camera 121 and a microphone module 123. The camera 121 processes various image frames, such as, still images or moving images captured by an image sensor during a video call mode or an image capturing mode. The image frames processed by the camera 121 may be displayed by a display module 151. The image frames processed by the camera 121 may be stored in the memory 160 or may be transmitted from the mobile terminal 100 through the wireless communication unit 110. The mobile terminal 100 may include two or more of the cameras 121.

The microphone module 123 receives external sound signals during a call mode, a recording mode, or a voice recognition mode with the use of a microphone and converts the sound signals into electrical sound data. In the call mode, the mobile communication module 113 may convert the electrical sound data into data that can be readily transmitted to a mobile communication base station and then output the data obtained by the conversion. The microphone module 123 may use various noise removal algorithms to remove noise that may be generated during the reception of external sound signals.

The user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151. In such a case, the user input unit 130 and the display module 151 may be collectively referred to as a touch screen.

The sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143, and an acceleration sensor 145. The proximity sensor 141 may determine whether there is an entity nearby and approaching the mobile terminal 100, without any mechanical contact with the entity. More specifically, the proximity sensor 141 may detect the entity that is nearby and approaching by detecting a change in an alternating magnetic field or the rate of change of static capacitance thereof. The sensing unit 140 may include two or more of the proximity sensors 141.

The pressure sensor 143 may determine whether pressure is being applied to the mobile terminal 100 and may detect the magnitude of pressure applied to the mobile terminal 100. The pressure sensor 143 may be installed in a portion of the mobile terminal 100 in which the detection of pressure is necessary. For example, the pressure sensor 143 may be installed in the display module 151. In this case, the display module 151 may differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

Acceleration sensors are a type of device for converting an acceleration variation into an electric signal. With recent developments in micro-electromechanical system (MEMS) technology, acceleration sensors have been widely used in various products for various purposes. For example, an acceleration sensor may be installed in an airbag system for an automobile and may thus be used to detect collisions. Alternatively, an acceleration sensor may be used as an input device for a computer game and may sense the motion of the human hand during the computer game. Two or three of the acceleration sensors 145 representing different axial directions may be installed in the mobile terminal 100. Alternatively, only one acceleration sensor 145 representing a Z axis may be installed in the mobile terminal 100. In embodiments of the present invention, the acceleration sensor 145 may be referred to as a movement sensor.

The output unit 150 may output audio signals, video signals and alarm signals. The output unit 150 may include the display module 151, an audio output module 153, an alarm module 155, and a haptic module 157. The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure, and are thus implemented as a touch screen, the display module 151 may be used not only as an output device, but also as an input device. If the display module 151 is implemented as a touch screen, the display module 151 may also include a touch screen panel (not shown) and a touch screen panel controller (not shown). The touch screen panel is a transparent panel attached onto the exterior of the mobile terminal 100 and may be connected to an internal bus (not shown) of the mobile terminal 100. The touch screen panel keeps monitoring whether the touch screen panel is being touched by a user. Once a touch input to the touch screen panel occurs, the touch screen panel transmits a number of signals corresponding to the touch input to the touch screen panel controller. The touch screen panel controller processes the signals transmitted by the touch screen panel, and transmits the processed signals to the control unit 180. Then, the control unit 180 determines whether a touch input has occurred and which part of the touch screen panel has been touched based on the processed signals transmitted by the touch screen panel controller.

The display module 151 may be implemented as electronic paper (e-paper). E-paper is a type of reflective display technology and can provide as high resolution as ordinary ink on paper, wide viewing angles, and excellent visual properties. E-paper may be implemented on any type of substrate such as a plastic, metallic or paper substrate and may sustain an image displayed thereon even when power is cut off. In addition, e-paper may be able to reduce the power consumption of the mobile terminal 100 because it does not require a backlight assembly. The display module 151 may be implemented as e-paper by using electrostatic-charged hemispherical twist balls, using electrophoretic deposition, or using microcapsules.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-

LCD, an organic light-emitting diode (OLED), a flexible display, and a three-dimensional (3D) display. The mobile terminal 100 may include two or more of the display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may output a signal upon receiving a call signal or a message. In addition, the alarm module 155 may receive a key signal and may output a signal as feedback to the key signal. Once a signal is output by the alarm module 155, the user may recognize that an event has occurred. A signal for notifying the user of the occurrence of an event may be output by the display module 151 or the audio output module 153.

The haptic module 157 may provide various haptic effects (such as vibrations) that can be perceived by the user. If the haptic module 157 generates vibration as one of the haptic effects, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various other haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by imparting a sense of heat or cold to a user using a device capable of absorbing heat or generating heat. The haptic module 157 may be configured to enable the user to recognize a haptic effect using the kinesthetic sense of the fingers or the arms. The mobile terminal 100 may include two or more of the haptic modules 157.

The memory 160 may store various programs necessary for the operation of the controller 180. In addition, the memory 160 may temporarily or indefinitely store various data such as a phonebook, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device. If the mobile terminal 100 is connected to an external cradle, power may be supplied from the external cradle to the mobile terminal 100 through the interface unit 170, and various command signals may be transmitted from the external cradle to the mobile terminal 100 through the interface unit 170.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program. The power supply unit 190 is supplied with power by an external power source or an internal power source, and supplies power to other components in the mobile terminal 100.

The mobile terminal 100 may include a wired/wireless communication system and a satellite-based communication system. The mobile terminal 100 may be configured to be able to operate in a communication system transmitting data as frames or packets.

The exterior of the mobile terminal 100 will hereinafter be described in detail with reference to FIGS. 2 and 3. For convenience, it will be assumed that the mobile terminal 100 is a slider-type mobile phone. However, embodiments of the present invention are not restricted to the slider-type mobile phone. Rather, the embodiments of the present invention can be applied to various mobile phones, other than a slider-type mobile phone, or to other devices.

Figure 2:
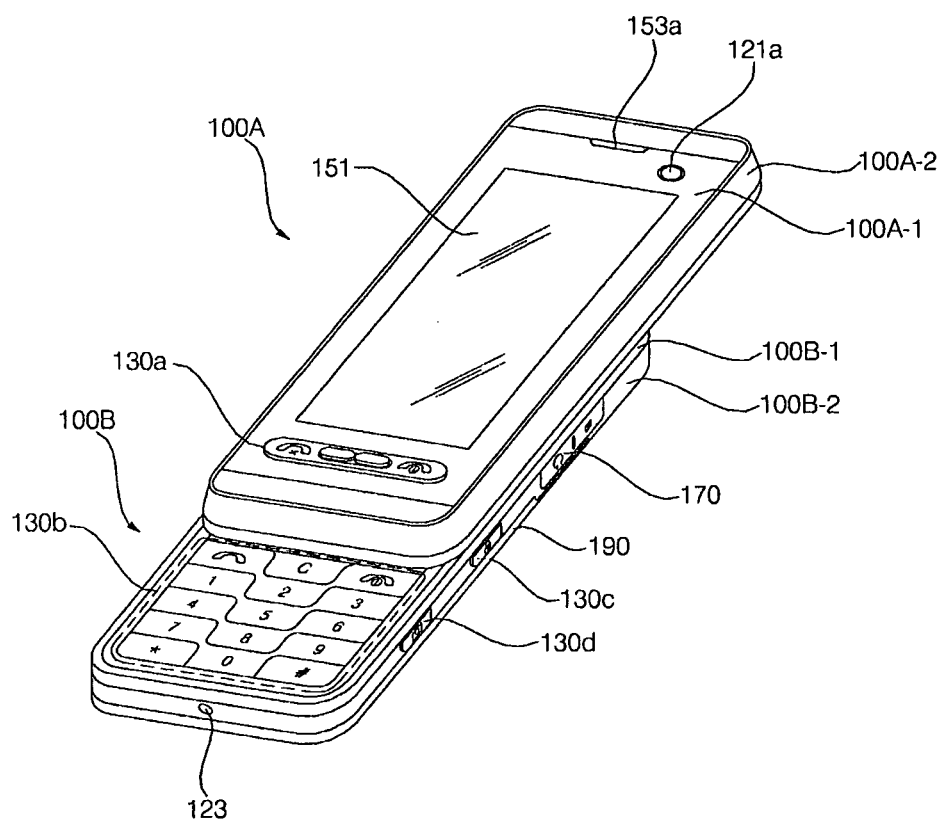
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 includes a first body 100A and a second body 100B configured to be able to slide in at least one direction along the first body 100A. When the first body 100A overlaps the second body 100B, the mobile terminal 100 is determined to be closed. When the first body 100A exposes at least part of the second body 100B, the mobile terminal 100 is determined to be opened.

When the mobile terminal 100 is closed, the mobile terminal 100 generally operates in a standby mode, and may be manually released from the standby mode by a user. When the mobile terminal 100 is opened, the mobile terminal 100 generally operates in a call mode, and may be placed in a standby mode either manually by a user or automatically after the lapse of a predetermined amount of time.

The first body 100A may include a first front case 100A-1 and a first rear case 100A-2, which form the exterior of the first body 100A. Various electronic products may be installed in the space between the first front case 100A-1 and the first rear case 100A-2. At least one intermediate case may be additionally disposed between the first front case 100A-1 and the first rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first sound module 153a, a first camera 121a and a first user input module 130a may be disposed in the first front case 100A-1. The display module 151 may include a liquid crystal display (LCD) or an organic light emitting diode display (OLED), which visually represents information. Since a touch pad is configured to overlap the display module 151, to realize a layer structure, the display module 151 may serve as a touch screen. Thus, it is possible for a user to input information to the display module 151 simply by touching the display module 151. The first sound module 153a may be implemented as a receiver or a speaker. The first camera 121a may be configured to capture a still image or a moving image of a user.

Referring back to FIG. 2, the second body 100B may include a second front case 100B-1 and a second rear case 100B-2, which form the exterior of the second body 100B. A second user input module 130b may be disposed at the front of the second body 100B, and particularly, at the front of the second front case 100B-1. Third and fourth user input modules 130c and 130d, the microphone 123 and the interface unit 170 may be disposed in the second front case 100B-1 or the second rear case 100B-2.

The first through fourth user input modules 130a through 130d may be collectively referred to as the user input unit 130. The user input unit 130 may adopt various manipulation methods as long as it can offer tactile feedback to a user. For example, the user input unit 130 may be implemented as a dome switch or a touch pad which receives a command or information upon being pushed or touched by a user. Alternatively, the user input unit 130 may be implemented as a wheel, a jog dial, or a joystick.

The first user input module 130a may allow a user to input such commands as 'start', 'end', and 'scroll'. The second user input module 130b may allow a user to input numbers, characters or symbols. The third and fourth user input modules 130c and 130d may serve as hot keys for activating certain functions of the mobile terminal 100.

The microphone 123 may be configured to be able to receive the voice of a user or other sounds. The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100. The interface unit 170 may be a SIM or a UIM, or may be a card socket for an exterior-type card such as a memory card for storing data.

The power supply unit 190 may be inserted in the second rear case 100B-2. The power supply unit 190 may be a rechargeable battery and may be coupled to the second body 100B so as to be able to be attached to or detached from the second body 100B.

Figure 3:
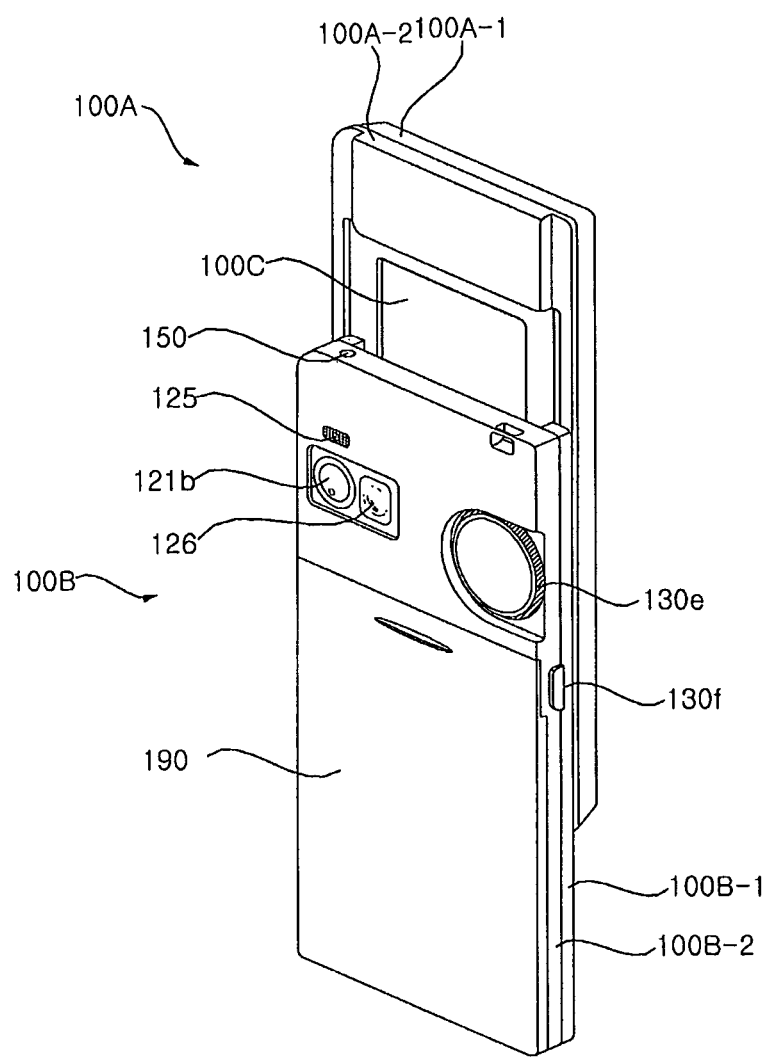
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fifth user input module 130e and a second camera 121b may be disposed at the rear of the second rear case 100B-2 of the second body 100B. The fifth user input module 130e may be of a wheel type. In addition, a sixth user input module 130f may be disposed on a lateral side of the second body 100B.

The second camera 121b may have a different photographing direction from that of the first camera 121a shown in FIG. 2. In addition, the number of pixels of the second camera 121b may be different from the number of pixels of the first camera 121a. For example, the first camera 121a may be used to capture an image of the face of a user and then readily transmit the captured image during a video call. Thus, a low-pixel camera may be used as the first camera 121a. The second camera 121b may be used to capture an image of an ordinary subject. Given that images captured by the second camera 121b generally do not need to be transmitted, a high-pixel camera may be used as the second camera 121b. A camera flash 125 and a mirror 126 may be disposed near the second camera 121b. The camera flash 125 illuminates a subject when the second camera 121b captures an image of the subject. The user may look in the mirror 126 for taking a self shot.

A second audio output module (not shown) may be additionally provided in the second rear case 100B-2. The second audio output module may realize a stereo function along with the first audio output module 153a. The second audio output module may also be used during a speaker-phone mode. An antenna (not shown) for receiving a broadcast signal may be disposed on one side of the second rear case 100B-2. The antenna may be installed so as to be able to be pulled out from the second body 100B-2.

A slider module 100C may be disposed on the first rear case 100A-2 of the first body 100A. The slider module 100C may couple the first body 100A and the second body 100B so that the first body 100A can slide along the second body 100B. The slider module 100C may be partially exposed by the second front case 100B-1.

The second camera 121b is illustrated in FIG. 3 as being disposed on the second body 100B, but the present invention is not restricted to this. For example, at least one of the antenna, the second camera 121b and the camera flash 125 may be mounted on the first body 100A, and particularly, the first rear case 100A-2 of the first body 100A. In this case, whichever of the antenna, the second camera 121b and the camera flash 125 is mounted on the first rear case 100A-2 may be protected by the second body 100B when the mobile terminal 100 is closed. The first camera 121a may be able to rotate to cover the photographing direction of the second camera 121a. In this case, the second camera 121b maybe optional.

Figure 4:
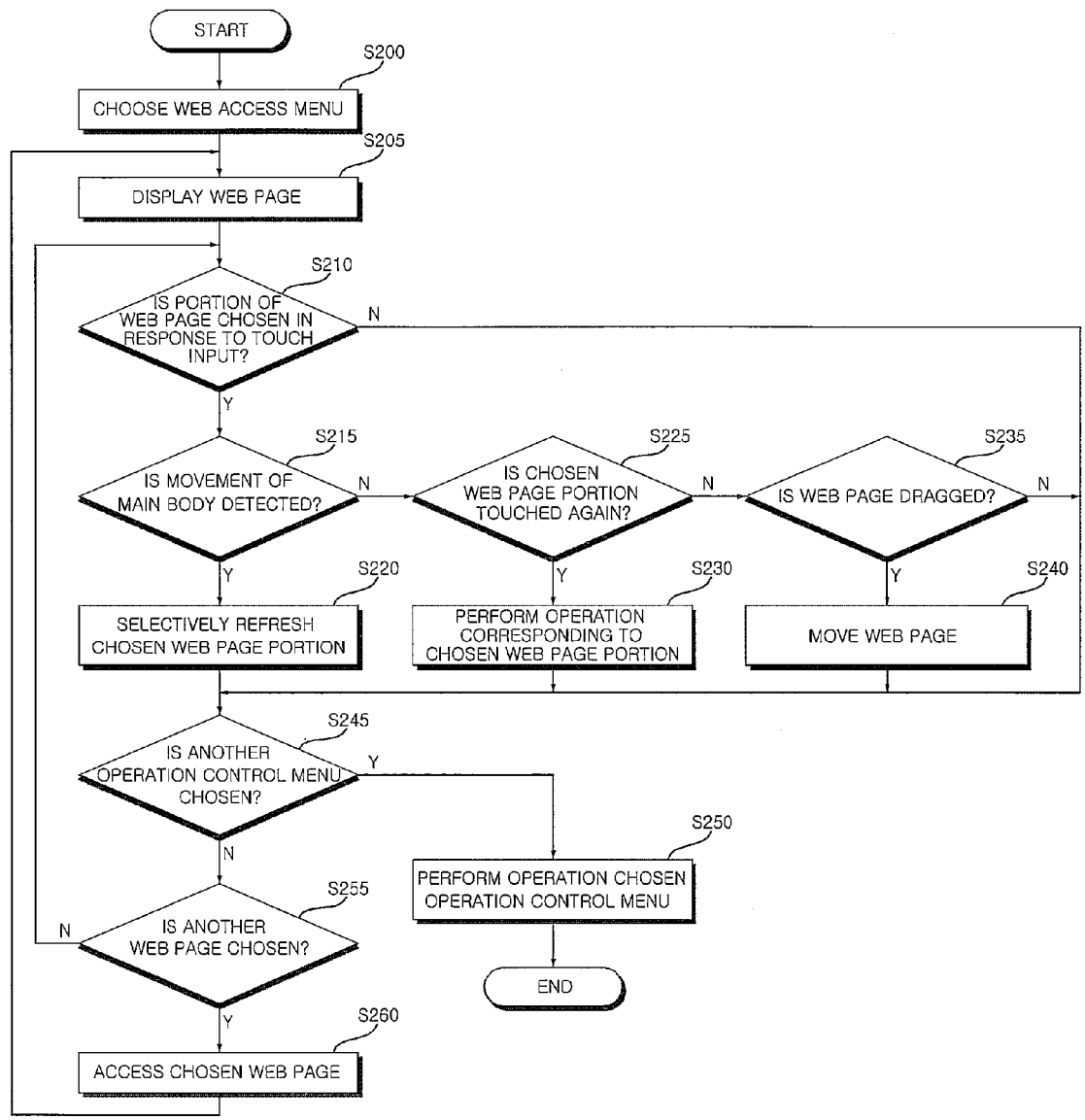
FIG. 4 illustrates a flowchart of a method of controlling a mobile terminal according to a first example embodiment of the present invention.

FIG. 4 illustrates a flowchart of a method of controlling a mobile terminal according to a first example embodiment of the present invention. Referring to FIG. 4, if a web access menu is chosen in response to a user command (S200), the controller 180 may drive a web browser, may access a web page corresponding to a desired web page address with the use of the wireless Intenet module 115, and may control the display module 151 to display the web page (S205).

Thereafter, the controller 180 may determine whether a portion of the web page is chosen in response to a touch input (S210). More specifically, the controller 180 may determine whether a touch input has been made to the display module 151, which part of the display module 151 has been touched and/or whether a touch-and-drag input has been received through the display module 151 based on a signal provided by the display module 151. The controller 180 may choose a portion of the web page having a predetermined size and including a touch point from which a touch input is detected. Alternatively, the controller 180 may divide the web page into a number of regions and may choose one of the regions including the touch point. Still alternatively, the controller 180 may choose a portion of the web page including mail information, news information, product information, or advertisement information displayed near the touch point. The controller 180 may choose two or more portions of the web page.

Thereafter, if a portion of the web page is chosen and the movement of the main body of the mobile terminal 100 including the first body 100A and the second body 100B is detected (S215), the controller 180 may selectively refresh the chosen web page portion and may display a web page obtained by the refreshing (S220). More specifically, if it is determined based on a measurement value provided by the acceleration sensor 143 that the main body of the mobile terminal 100 has been reciprocally moved or rotated about a predetermined axial direction, has been laid down, picked up, made to stand on end, or placed in other positions, the controller 180 may selectively refresh the chosen web page portion.

Alternatively, if the movement of the main body of the mobile terminal 100 is not detected, or subsequently, if another touch input is received for the chosen web page portion, i.e., if the chosen web page portion is touched again (S225), the controller 180 may control an operation corresponding to the chosen web page portion to be performed (S230). Examples of the operation corresponding to the chosen web page portion include scaling up the chosen web page portion, displaying detailed information regarding the chosen web page portion, executing a multimedia file linked to the chosen web page portion and displaying a web page linked to the chosen web page portion.

Alternatively, if another touch input is not received for the chosen web page portion, or subsequently, if the web page is touched and dragged (S235), i.e., if a touch input and a drag input are received for the web page, the controller 180 may move the web page according to a distance and a direction corresponding to the drag input to show other portions of the web page (S240).

If an operation control menu such as a menu for terminating the web access menu or a menu for executing a menu other than the web access menu is chosen (S245), the controller 180 may control an operation corresponding to the chosen operating control menu to be performed (S250). On the other hand, if no such operation control menu is chosen and a request for access to another web page is received (S255), the controller 180 may access a web page corresponding to the received request (S260), and the method returns to operation S205. In this manner, it is possible to reduce the time taken to refresh a web page by selectively refreshing a portion of the web page chosen by the user in response to the movement of the main body of the mobile terminal 100, and maintaining the chosen portion of the web page in view while being refreshed.

Figure 5:
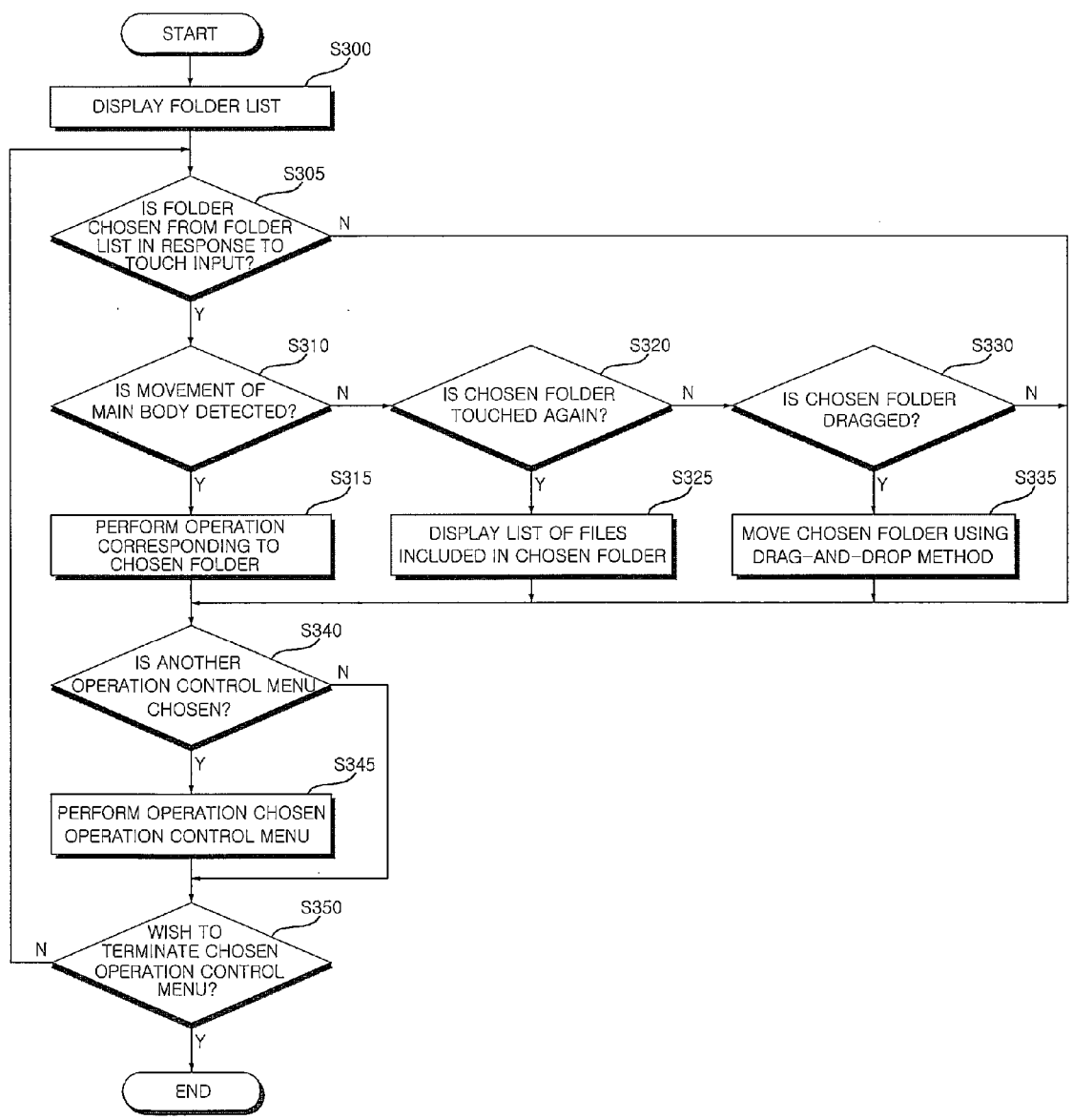
FIG. 5 illustrates a flowchart of a method of controlling a mobile terminal according to a second example embodiment of the present invention.

FIG. 5 illustrates a flowchart of a method of controlling a mobile terminal according to a second example embodiment of the present invention. Referring to FIG. 5, if a menu for, for example, checking an email folder or a multimedia file folder, is chosen in response to a user command, the controller 180 may control the display module 151 to display a folder list corresponding to the chosen menu (S300).

Thereafter, the controller 180 may determine whether one of a plurality of folders included in the folder list is chosen (S305). If one of the folders included in the folder list is chosen in response to a touch input and the movement of the main body of the mobile terminal 100 including the first body 100A and the second body 100B is detected (S310), the controller 180 may perform an operation corresponding to the chosen folder (S315).

If the chosen folder is an email folder, the operation corresponding to the chosen folder may involve refreshing the number of new emails and the total number of emails included in the email folder. If the chosen folder is a multimedia file folder, the operation corresponding to the chosen folder may involve rearranging a plurality of multimedia files included in the multimedia file folder and sequentially playing the rearranged multimedia files.

Alternatively, if the movement of the main body of the mobile terminal 100 is not detected, or subsequently, if another touch input is received for the chosen folder, i.e., if the chosen folder is touched again (S320), the controller 180 may display a file list including the emails or the multimedia files included in the chosen folder (S325).

Alternatively, if another touch input is not received for the chosen folder, or subsequently, if a drag input for dragging the chosen folder to a predetermined location is received (S330), the controller 180 may move the chosen folder to the predetermined location and may display the chosen folder at the predetermined location using a drag-and-drop method (S335).

If another operation control menu is chosen (S340), the controller 180 may control an operation corresponding to the chosen operation control menu to be performed (S345). Operations S305 through S345 may be performed repeatedly until the user wishes to terminate the chosen operation control menu (S350). In this manner, it is possible for the user to acquire any desired information from a folder list without the need to manually search through each folder included in the folder list.

Figure 6:
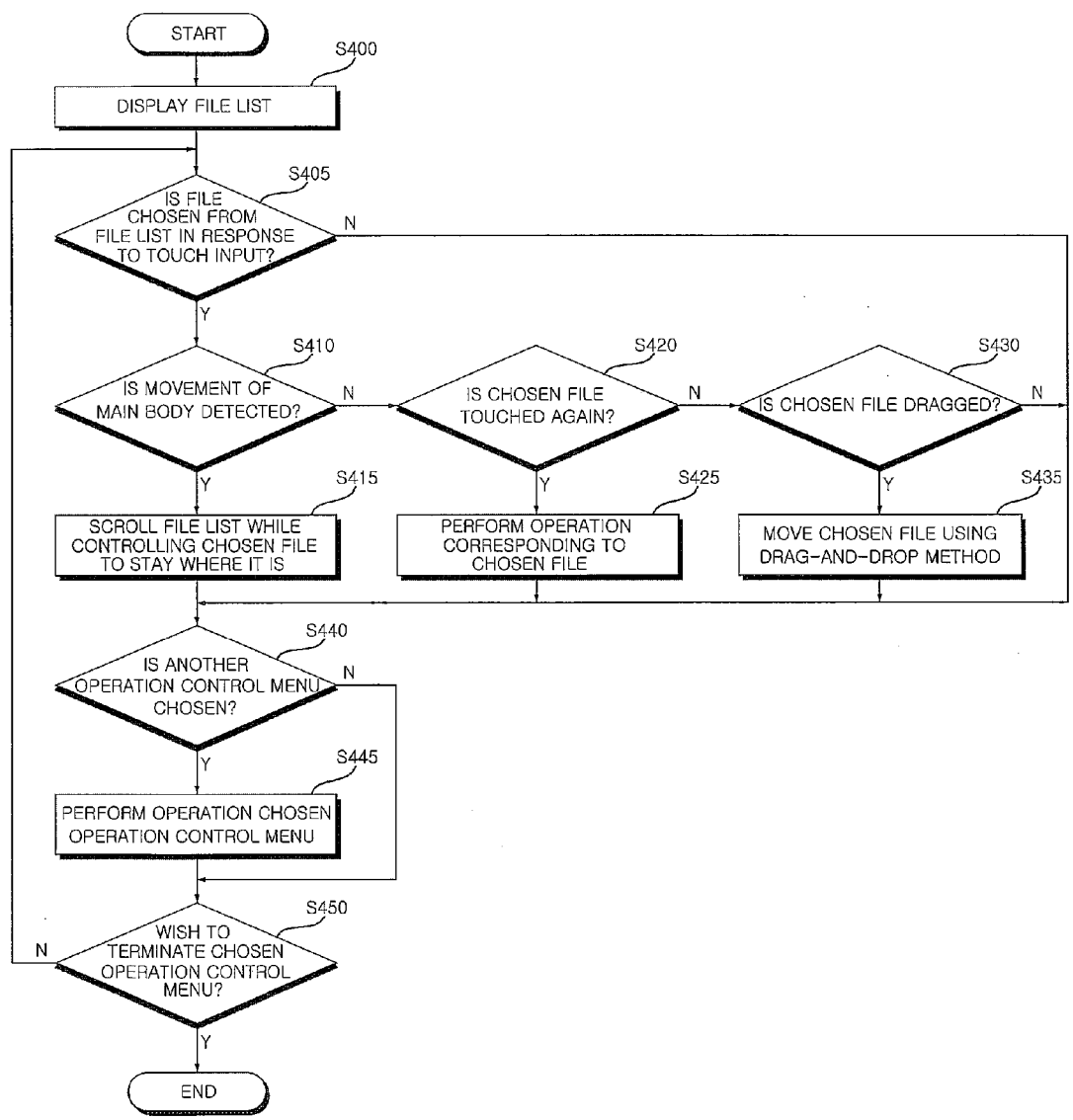
FIG. 6 illustrates a flowchart of a method of controlling a mobile terminal according to a third example embodiment of the present invention.

FIG. 6 illustrates a flowchart of a method of controlling a mobile terminal according to a third example embodiment of the present invention. Referring to FIG. 6, if a menu requiring the display of a file list such as a phonebook menu, an email inbox/outbox menu, an MP3 player menu or a moving image player menu is chosen in response to a user command, the controller 180 may control the display module 151 to display a file list corresponding to the chosen menu (S400). Thereafter, the controller 180 may determine whether one of a plurality of files included in the file list is chosen in response to a touch input (S405).

If one of the files included in the file list is chosen and the movement of the main body of the mobile terminal 100 is detected (S410), the controller 180 may control the file list excluding the chosen file to be scrolled. More specifically, the controller 180 may control the chosen file to stay in place and may scroll through the other non-chosen files in the file list.

Alternatively, if the movement of the main body of the mobile terminal 100 is not detected, or subsequently, if another touch input is received for the chosen file, i.e., if the chosen file is touched again (S420), the controller 180 may control an operation corresponding to the chosen file to be performed (S425). Examples of the operation corresponding to the chosen file include playing the chosen file and displaying an image corresponding to the chosen file.

Alternatively, if another touch input is not received for the chosen file, or subsequently, if a drag for dragging the chosen file to a predetermined location is received (S430), the controller 180 may move the chosen file to the predetermined location and may display the chosen file at the predetermined location using a drag-and-drop method (S435).

If another operation control menu is chosen (S440), the controller 180 may control an operation corresponding to the chosen operation control menu to be performed (S445). Operations S405 through S445 may be performed repeatedly until the user wishes to terminate the chosen operation control menu. In this manner, it is possible to effectively scroll a file list excluding one or more chosen items in response to a touch input and the movement of the main body of the mobile terminal 100.

Figure 7:
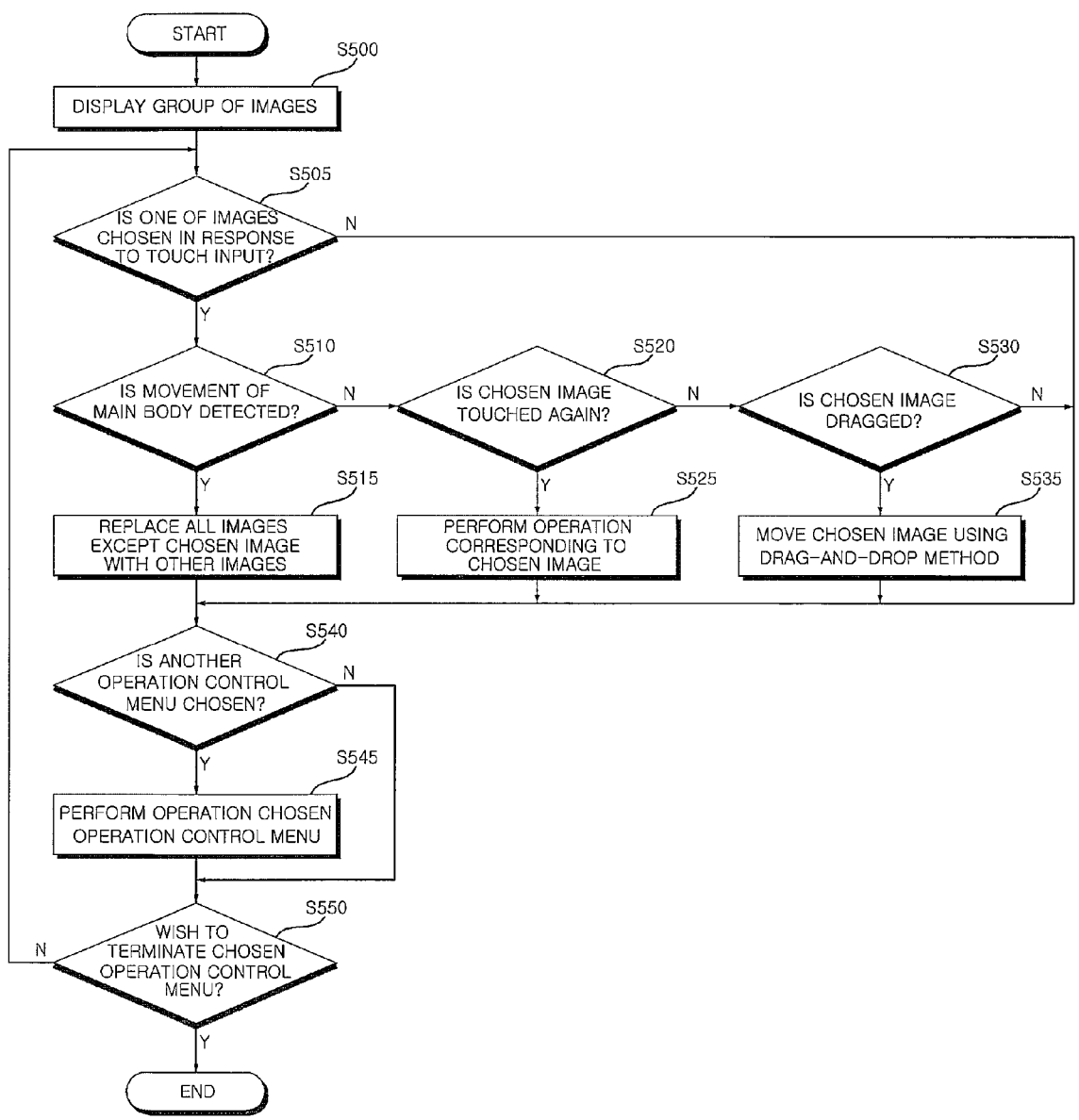
FIG. 7 illustrates a flowchart of a method of controlling a mobile terminal according to a fourth example embodiment of the present invention.

FIG. 7 illustrates a flowchart of a method of controlling a mobile terminal according to a fourth example embodiment of the present invention. Referring to FIG. 7, the controller 180 may control the display module 151 to display a plurality of images in response to a user command or the selection of a predetermined menu (S500). Examples of the images include typical graphic images, menu icons and touch keys.

Thereafter, the controller 180 may determine whether one of the images is chosen in response to a touch input (S505). If one of the images is chosen in response to a touch input and the movement of the main body of the mobile terminal 100 is detected (S510), the controller 180 may replace all the images except the chosen image with other images (S515).

Alternatively, if the movement of the main body of the mobile terminal 100 is not detected, or subsequently, if another touch input is detected for the chosen image, i.e., if the chosen image is touched again (8520), the controller 180 may control an operation corresponding to the chosen image to be performed (S525). Examples of the operation corresponding to the chosen image include scaling up the chosen image, playing a file corresponding to the chosen image and displaying a number of menus corresponding to the chosen image.

Alternatively, if another touch input is not detected for the chosen image, or subsequently, if a drag input for dragging the chosen image to a predetermined location is received (S530), the controller 180 may move the chosen image to the predetermined location and may display the chosen image at the predetermined location using a drag-and-drop method (S535).

If another operation control menu is chosen (S540), the controller 180 may control an operation corresponding to the chosen operation control menu to be performed (S545). Operations S505 through S545 may be performed repeatedly until the user wishes to terminate the chosen operation menu. In this manner, it is possible to replace a group of images except for one or more chosen images in response to a touch input and the detection of the main body of the mobile terminal 100.

Figure 8A:
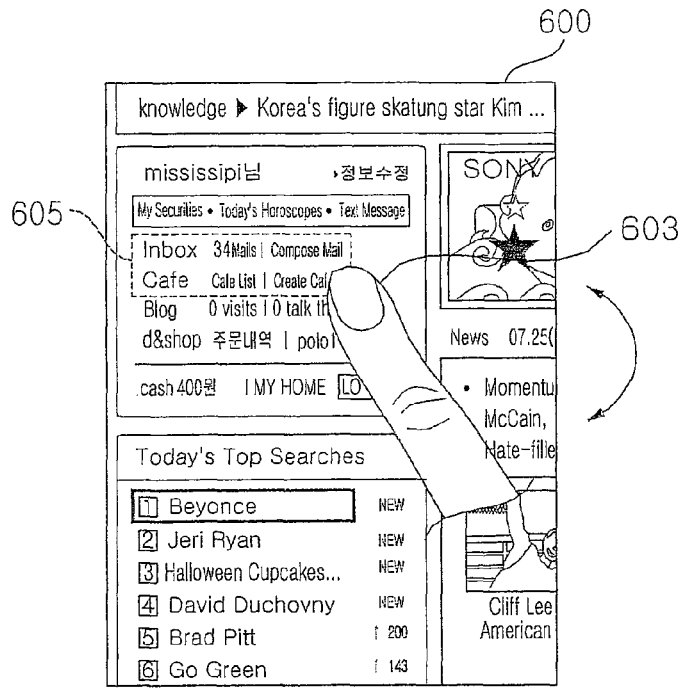
FIGS. 8A through 8C illustrate diagrams for explaining how to selectively refresh a portion of a web page according to an example embodiment of the present invention.
Figure 8B:
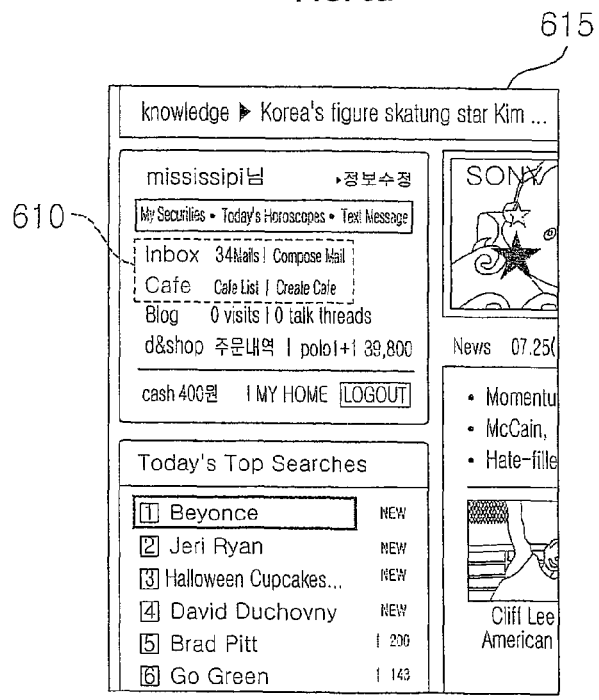

FIGS. 8A through 12B illustrate diagrams for explaining the methods of the first through fourth example embodiments. More specifically, FIGS. 8A through 8C illustrate diagrams for explaining how to selectively refresh a portion of a web page. Referring to FIG. 8A, when a web access menu is chosen, the display module 151 may display a web page screen 600. If a web page portion 605 in which email quantity information is displayed is chosen from the web page screen 600 in response to a touch input 603 and then the main body of the mobile terminal 100 is moved, such as, is rotated or shaken, the web page portion 605 may be selectively refreshed, and thus, an updated web page portion 615 may be displayed, as shown in FIG. 8B.

Figure 8C:

If the web page portion 605 shown in FIG. 8A is touched twice in a row, an email menu may be executed, and an email list screen 630 including a list of received emails may be displayed, as shown in FIG. 8C. In this manner, it is possible to selectively refresh any desired portion of a web page and reduce the time taken to refresh a web page. In addition, since a desired portion of a web page stays in place even after being refreshed, there is no need to move the web page to view the desired web page portion.

Figure 9A:
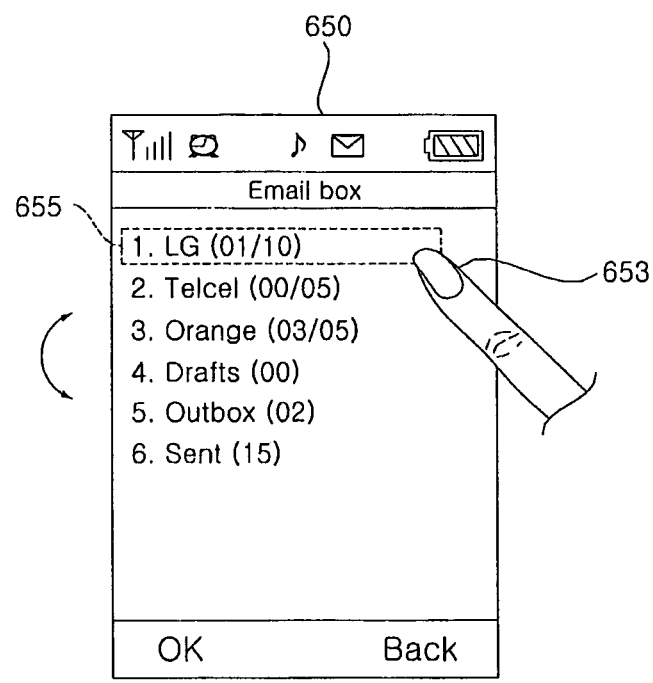
FIGS. 9A and 9B illustrate diagrams for explaining how to selectively refresh a folder chosen from a folder list screen according to an example embodiment of the present invention.
Figure 9B:
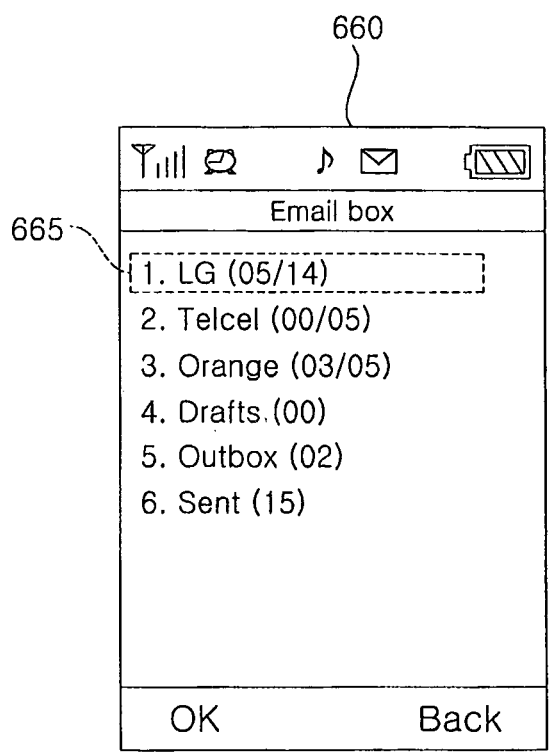

FIGS. 9A and 9B illustrate diagrams for explaining how to refresh a folder chosen from a folder list screen. Referring to FIG. 9A, if one of a plurality of email folders displayed on an email folder screen 650, e.g., a first email folder 655, is chosen in response to a touch input 653 and then the main body of the mobile terminal 100 is moved, such as, is rotated or shaken, the chosen email folder may be selectively refreshed, and thus, an updated first email folder 665 having updated information regarding the number of new received emails and the total number of emails may be displayed, as shown in FIG. 9B. In this manner, it is possible to selectively update any desired folder information without the need to choose any folders.

Figure 10A:
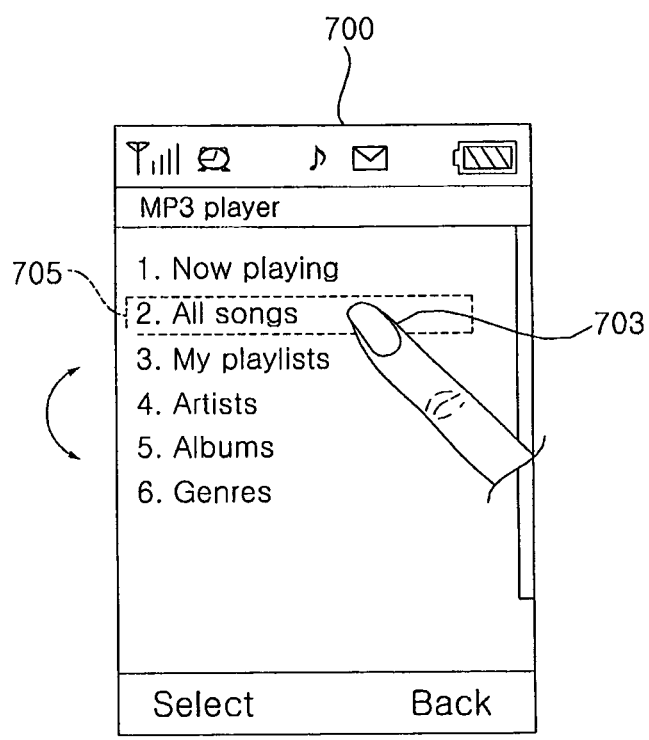
FIGS. 10A and 10B illustrate diagrams for explaining how to perform an operation corresponding to a folder chosen from a multimedia folder list screen, according to an example embodiment of the present invention.
Figure 10B:
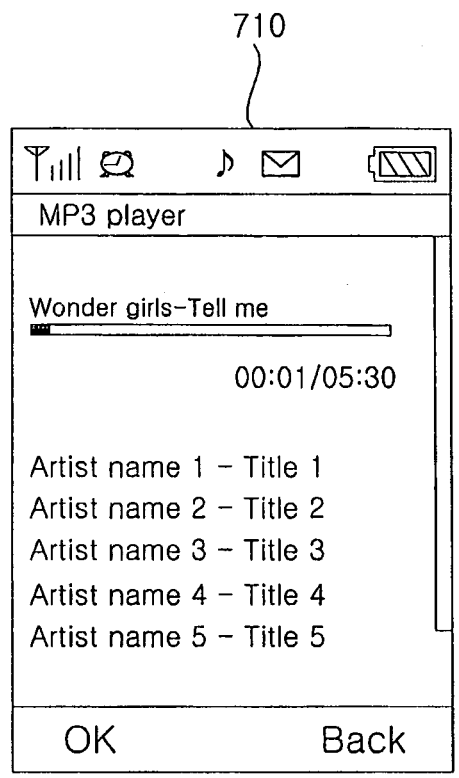

FIGS. 10A and 10B illustrate diagrams for explaining how to perform an operation corresponding to a multimedia folder chosen from a multimedia folder screen. Referring to FIG. 10A, if one of a plurality of multimedia folders displayed on a multimedia folder screen 700, e.g., a second folder 705, is chosen in response to a touch input 703 and then the movement of the main body of the mobile terminal 100 is detected, a plurality of multimedia files included in the second folder 705 may be rearranged, and the rearranged multimedia files may be sequentially played, as shown in FIG. 10B. If one of the multimedia folders displayed on the multimedia folder screen 700 is touched twice in a row, a file list including a plurality of multimedia files included in the touched multimedia folder may be displayed.

Figure 11A:
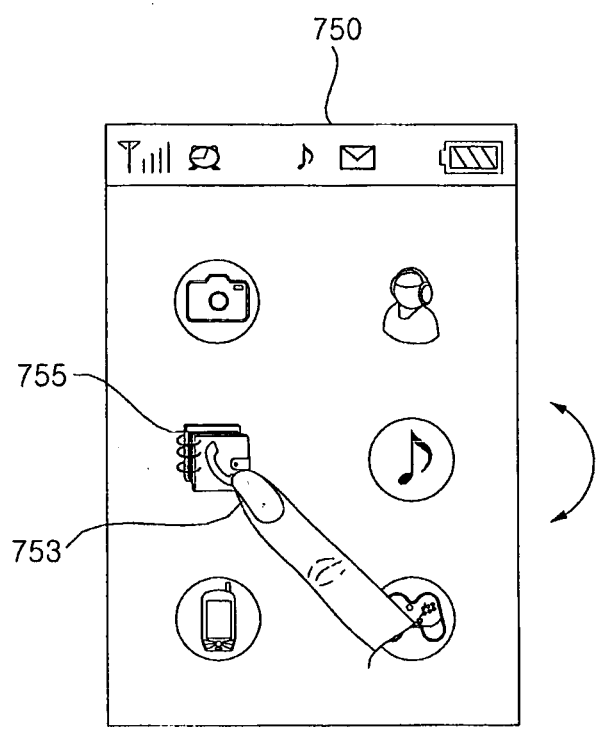
FIGS. 11A and 11B illustrate diagrams for explaining how to replace a group of images except one or more chosen images according to an example embodiment of the present invention.
Figure 11B:
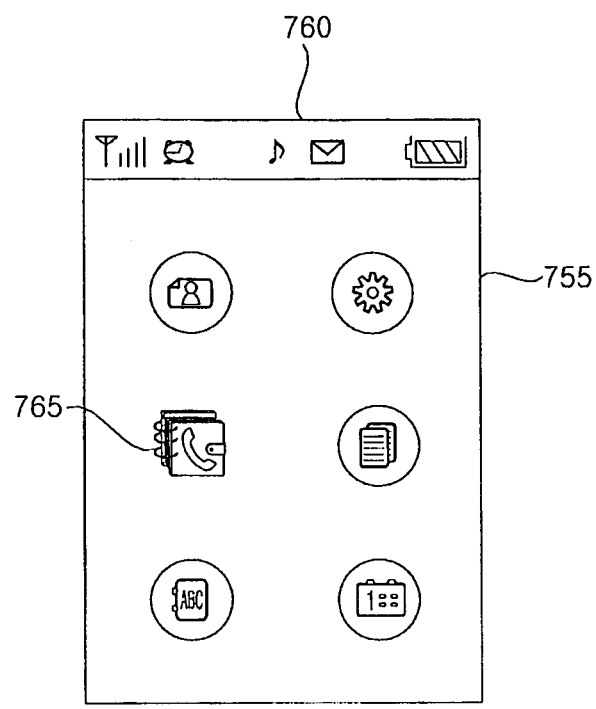

FIGS. 11A and 11B illustrate diagrams for explaining how to replace a group of images except one or more chosen images. Referring to FIG. 11A, if one of a plurality of menu icons displayed on a menu icon screen 750, i.e., a menu icon 755, is chosen in response to a touch input 755, and then the movement of the main body of the mobile terminal 100 is detected, such as when rotated or shaken, all the menu icons except the menu icon 755 may be replaced with other menu icons, as shown in FIG. 11B. In this manner, it is possible to replace a group of menu icons except one or more icons desired by the user in response to a touch input and the movement of the main body of the mobile terminal, and thus, to improve user convenience regarding the selection of menus.

Figure 12A:
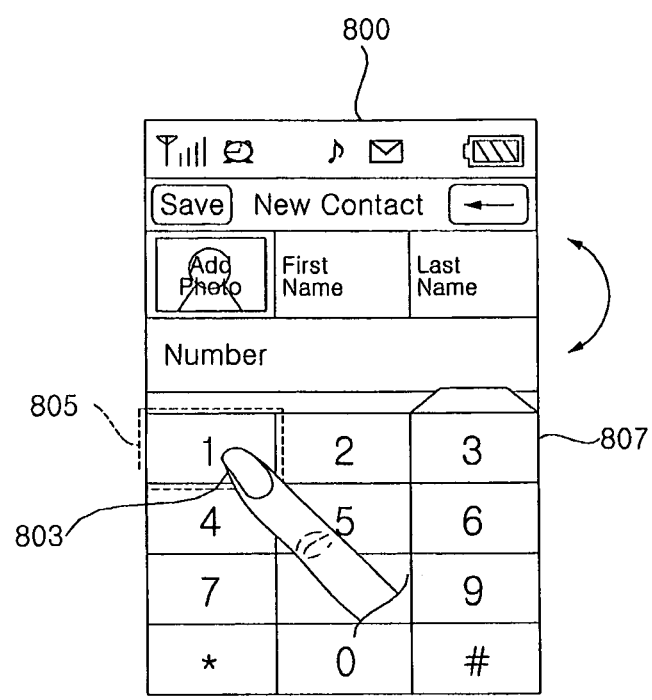
FIGS. 12A and 12B illustrate diagrams for explaining how to replace a group of touch keys except one or more touch keys chosen from a keypad input window according to an example embodiment of the present invention.
Figure 12B:
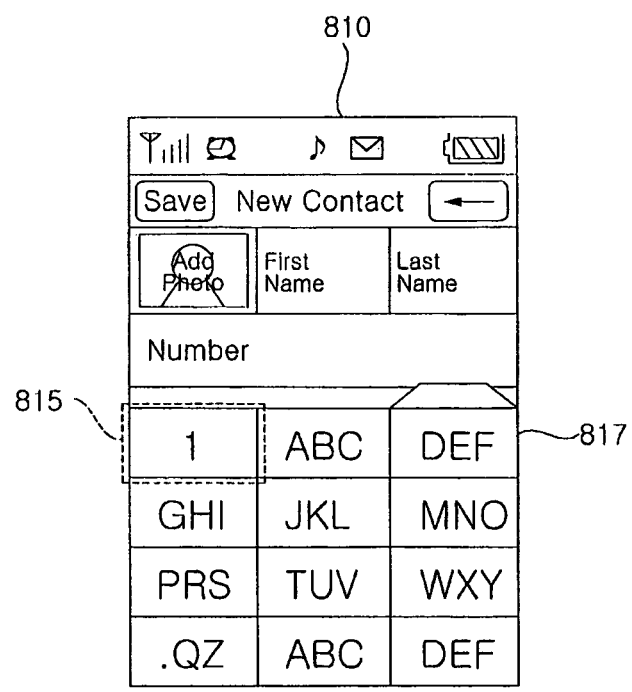

FIGS. 12A and 12B illustrate diagrams for explaining how to replace a group of touch keys except one or more touch keys chosen from a touch keypad input window. Referring to FIG. 12A, if one of a plurality of touch keys displayed in a touch keypad input window 807, e.g., a touch key '1' 805, is chosen in response to a touch input 803 and the movement of the main body of the mobile terminal 100 is detected, such as when rotated or shaken, all the touch keys except for the touch key '1' 805 may be replaced with other touch keys for inputting alphabet letters, as shown in FIG. 12B. In this manner, it is possible to replace a group of touch keys except one or more touch keys desired by the user in response to a touch input and the movement of the main body of the mobile terminal, and thus, to improve user convenience regarding the inputting of characters or symbols.

It is noted that embodiments of the present invention may distinguish between various movements of the mobile terminal 100, for example, in different directions, and the various movements of the mobile terminal 100 may be associated with a particular function of the mobile terminal 100. For example, a movement to the right for the mobile terminal 100 may cause the mobile terminal 100 to perform one function, while a movement to the left for the mobile terminal may cause the mobile terminal 100 to perform another function. Further, a movement to the right may cause the mobile terminal 100 to perform one function, while a movement to the left may cause the mobile terminal 100 to cancel the one function, reverse the function, or return the mobile terminal 100 to a previous stated. Similar embodiments apply to and up-down pair of movements, a forward-backward pair of movements, or other pair of movements of the mobile terminal 100 that may be chosen by the user. In other embodiments, a one or more movements of the mobile terminal 100, such as a series of movements for example, may cause a function of the mobile terminal 100 to be performed.

Additionally, with respect to detecting the movement of the main body, such as those of S210, S310, S410, and S510 of FIGS. 4, 5, 6 and 7, for example, the movement may occur simultaneously, or subsequently, to the immediately previous choosing step of the portion of the webpage, the one of a plurality of folders included in the folder list, the one of the files included in the file list, and the one of the plurality of images, respectively. If the movement of the main body is subsequent to the previous choosing step, the period between the choosing step and the movement step may be a predetermined amount of time.

Further, in the choosing steps S210, S310, S410, and S510 of FIGS. 4, 5, 6 and 7, for example, the chosen portion of the web page, the chosen one of a plurality of folders included in the folder list, the chosen one of the files included in the file list, and the chosen plurality of images may be locked by the touch input so that the subsequent movement of the mobile terminal 100 may occur subsequently at an indefinite time. That is, a user need not continuously press the chosen portion of the web page, the chosen one of a plurality of folders included in the folder list, the chosen one of the files included in the file list, and the chosen plurality of images, while movement of the mobile terminal 100 occurs.

In this respect, the lock on the chosen portion of the web page, the chosen one of a plurality of folders included in the folder list, the chosen one of the files included in the file list, and the chosen plurality of images, may be released once the movement of the mobile terminal 100 is detected, or once another touch input is detected for the chosen portion of the web page, the chosen one of a plurality of folders included in the folder list, the chosen one of the files included in the file list, and the chosen plurality of images. Yet further, in various embodiments of the present invention, an amount of force and/or time to detect the movement of the mobile terminal 100 may be predetermined.

The mobile terminal according to embodiments of the present invention and the method of controlling a mobile terminal according to embodiments of the present invention are not restricted to the example embodiments set forth herein. Therefore, variations and combinations of the example embodiments set forth herein may fall within the scope of the present invention.

The present invention can be realized as code that can be read by a processor (such as a mobile station modem (MSM)) included in a mobile terminal and that can be written on a computer-readable recording medium so that various components of a device including the processor are able to interact with each other. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to embodiments of the present invention, it is possible to selectively refresh a portion of a web page or a screen image chosen by a user and to perform an operation corresponding to the chosen web page portion or the chosen screen image portion. Therefore, it is possible to quickly update any desired information through simple manipulation of a mobile terminal and to quickly perform any desired operation.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
   displaying a web page on a touch screen of the mobile terminal;
   choosing a portion of the web page having a predetermined size in response to a touch input to the touch screen;
   determining whether a movement of a main body of the mobile terminal is detected while the portion of the web page is being chosen, the movement of the main body representing that the main body of the mobile terminal is rotated, shaken or tilted; and
   selectively refreshing contents displayed within the chosen web page portion instead of refreshing the whole of the web page in response to the detection of the movement of the main body and displaying the refreshed web page portion on the touch screen.

2. The method of claim 1, further comprising, when the chosen web page portion is chosen again, performing an operation corresponding to the chosen web page portion.

3. The method of claim 2, wherein the performing of the operation corresponding to the chosen web page portion includes scaling up the chosen web page portion, displaying detailed information regarding the chosen web page portion, executing a multimedia file linked to the chosen web page portion and displaying a web page linked to the chosen web page portion.

4. The method of claim 1, further comprising, when the touch input and then a drag input are received for the web page, moving the web page in response to the drag input to show other parts of the web page.

5. The method of claim 1, wherein the choosing of a portion of the web page comprises choosing more than one portion of the web page.

6. The method of claim 1, wherein the chosen web page portion is a region of the web page in which at least one of email information, news information, product information and advertisement information is displayed.

7. A mobile terminal, comprising:
   a touch screen configured to display a web page;
   an acceleration sensor configured to determine a movement of a main body of the mobile terminal, the movement of the main body representing that the main body of the mobile terminal is rotated, shaken or tilted; and
   a controller configured to choose a portion of the web page having a predetermined size in response to a touch input to the touch screen, and
   exclusively refresh contents displayed within the chosen web page portion instead of refreshing the whole of the web page, when the movement of the main body of the mobile terminal is detected based on a measurement value provided by the acceleration sensor while the portion of the web page is being chosen,
   wherein the touch screen displays the web page portion refreshed by the controller.

8. The mobile terminal of claim 7, wherein, when the chosen web page portion is chosen again, the controller controls an operation corresponding to the chosen web page portion to be performed.

9. The mobile terminal of claim 7, wherein, when the web page is touched and then dragged, the controller moves the web page to show other portions of the web page.

10. A mobile terminal, comprising:
a touch screen configured to display a folder list;
an acceleration sensor configured to determine a movement of a main body of the mobile terminal, the movement of the main body representing that the main body of the mobile terminal is rotated, shaken or tilted; and
a controller configured to choose one of a plurality of folders included in the folder list in response to a touch input to the touch screen,
perform an operation corresponding to the chosen folder, when the movement of the main body of the mobile terminal is detected based on a measurement value provided by the acceleration sensor while the folder is being chosen, and
display a list including a plurality of files included in the chosen folder when the chosen folder is chosen again,
wherein the controller is further configured to update automatically email information included in the email folder in response to the detection of the movement of the main body, when the chosen folder is an email folder.

11. The mobile terminal of claim 10, wherein the operation corresponding to the chosen folder comprises rearranging a plurality of multimedia files included in the multimedia file folder and sequentially playing the rearranged multimedia files, when the chosen folder is a multimedia file folder.

* * * * *